United States Patent
Ranjan et al.

(10) Patent No.: US 11,420,856 B2
(45) Date of Patent: Aug. 23, 2022

(54) TRANSPORT VEHICLE FOR TRANSPORTING PAYLOADS

(71) Applicant: GREY ORANGE PTE. LTD., Singapore (SG)

(72) Inventors: Tejaswi Ranjan, Gurgaon (IN); Aditya Pradhan, Gurugram (IN); Ravish Kumbhare, Jalgaon (IN)

(73) Assignee: GREY ORANGE PTE. LTD., Singapore (SG)

( * ) Notice: Subject to any disclaimer, the term of this patent is extended or adjusted under 35 U.S.C. 154(b) by 275 days.

(21) Appl. No.: 16/728,869

(22) Filed: Dec. 27, 2019

(65) Prior Publication Data

US 2021/0197900 A1 Jul. 1, 2021

(51) Int. Cl.
*B66F 9/075* (2006.01)
*B60P 1/02* (2006.01)
(Continued)

(52) U.S. Cl.
CPC .......... *B66F 9/07559* (2013.01); *B60P 1/02* (2013.01); *B66F 9/065* (2013.01); *B66F 9/07586* (2013.01); *B60P 1/022* (2013.01); *B60P 1/6445* (2013.01); *B62D 33/10* (2013.01); *B66F 9/063* (2013.01)

(58) Field of Classification Search
CPC ........... B60P 1/02; B60P 1/6445; B60P 1/022; B62B 3/0643; B65G 1/0471; B66F 9/063; B66F 9/065; B66F 9/07559; B66F 9/07586; B62D 33/10
See application file for complete search history.

(56) References Cited

U.S. PATENT DOCUMENTS 10,773,935 B2* 9/2020 Yamamoto ............ B66F 7/0625
2013/0302132 A1* 11/2013 D'Andrea ............... B66F 9/063
414/807

FOREIGN PATENT DOCUMENTS

CN 107323194 A 11/2017
CN 108773794 A * 11/2018 .............. B66F 9/065
(Continued)

OTHER PUBLICATIONS

International Search Report and Written Opinion dated May 6, 2021 in corresponding PCT Application No. PCT/IB2020/001093 (10 pages).

*Primary Examiner* — James Keenan
(74) *Attorney, Agent, or Firm* — Oblon, McClelland, Maier & Neustadt, L.L.P.

(57) ABSTRACT

A transport vehicle for transporting payloads is provided. The transport vehicle includes primary and secondary chassis, and first and second sets of wheels for supporting the respective primary and secondary chassis. A guide arrangement is mounted on the primary chassis and the secondary chassis is slidably mounted on the guide arrangement. The primary and secondary chassis are parallel and spaced apart from each other. A payload lifting arrangement is positioned on a top surface of the secondary chassis to lift a payload. When a weight of the payload is below or equal to a threshold weight, the weight is distributed across the second set of wheels by way of the suspension arrangement. When the weight of the payload exceeds the threshold weight, the weight is distributed across the first and second sets of wheels by way of the guide arrangement and the suspension arrangement, respectively.

20 Claims, 7 Drawing Sheets

(51) Int. Cl.
*B66F 9/065* (2006.01)
*B60P 1/64* (2006.01)
*B62D 33/10* (2006.01)
*B66F 9/06* (2006.01)

(56) References Cited

FOREIGN PATENT DOCUMENTS

| | | |
|---|---|---|
| DE | 10 2013 002 860 A1 | 8/2014 |
| DE | 10 2017 011 058 A1 | 5/2019 |
| EP | 3034324 A1 * | 6/2016 .......... B66F 9/07586 |

* cited by examiner

TRANSPORT VEHICLE FOR TRANSPORTING PAYLOADS

FIELD OF THE DISCLOSURE

The present disclosure relates generally to transport vehicles, and more particularly, to transport vehicles for transporting payloads.

BACKGROUND

Facilities such as, but not limited to, warehouses, storage facilities, factories, or industrial laboratories may utilize transport vehicles or autonomous guided vehicles (AGVs) for performing various operations. For example, a storage facility may utilize transport vehicles for transporting inventory items or packages between various locations within the storage facility.

Conventionally, transport vehicles have been designed to include a single chassis and various drive wheels and castor wheels. The transport vehicles also, typically, include a suspension arrangement that provides stability to the transport vehicles and improves traction. Two conventional configurations exist for installing the suspension arrangement. In a first configuration, the suspension arrangement may couple the chassis to one or more castor wheels. In such a scenario, the transport vehicle may pitch (i.e., rock back and forth) about one or more points where the suspension arrangement is coupled to the castor wheels. The pitching of the transport vehicle may pose various problems. For example, a payload being transported by the transport vehicle may topple if an amplitude of the pitching exceeds a threshold. In a second configuration, the suspension arrangement couples the chassis to one or more drive wheels of the transport vehicle. In such a scenario, a weight of a payload being transported by the transport vehicle may cause suspension springs in the suspension arrangement to compress to a level of maximum compression. Consequently, the suspension springs may be unable to compress any further when the transport vehicle encounters the undulations on the floor surface, resulting in instability of the transport vehicle. In one such scenario, the wheels (castor wheels or drive wheels) of the transport vehicle may lose contact with the floor surface, resulting in a loss of traction and causing the transport vehicle and/or the payload carried by the transport vehicle to topple.

In light of the foregoing, technical improvements in a design of transport vehicles are required for improving stability of the transport vehicles and mitigating the aforementioned problems.

SUMMARY

In an embodiment of the present disclosure, a transport vehicle is provided. The transport vehicle includes a primary chassis and a first set of wheels attached to a bottom surface of the primary chassis. The first set of wheels supports the primary chassis. The transport vehicle further includes a guide arrangement mounted on the primary chassis and a secondary chassis slidably mounted on the guide arrangement. The primary chassis and the secondary chassis are parallel and spaced apart from each other. The transport vehicle further includes a second set of wheels coupled to the secondary chassis. The second set of wheels supports the secondary chassis. The transport vehicle further includes a suspension arrangement that couples the second set of wheels to the secondary chassis. The transport vehicle further includes a payload lifting arrangement positioned on a top surface of the secondary chassis to lift a payload. When a weight of the payload is below or equal to a threshold weight, the weight of the payload is distributed across the second set of wheels by way of the suspension arrangement. When the weight exceeds the threshold weight, the weight of the payload is distributed across the first and second sets of wheels by way of the guide arrangement and the suspension arrangement, respectively.

In an embodiment of the present disclosure, a system for transporting a payload is provided. The system includes a transport vehicle that includes a primary chassis and a first set of wheels attached to a bottom surface of the primary chassis. The first set of wheels supports the primary chassis. The transport vehicle further includes a guide arrangement mounted on the primary chassis and a secondary chassis slidably mounted on the guide arrangement. The primary chassis and the secondary chassis are parallel and spaced apart from each other. The transport vehicle further includes a second set of wheels coupled to the secondary chassis. The second set of wheels supports the secondary chassis. The transport vehicle further includes a suspension arrangement that couples the second set of wheels to the secondary chassis and a payload lifting arrangement positioned on a top surface of the secondary chassis to lift the payload. The system further includes a server that is configured to communicate, to the transport vehicle, a set of instructions to transport the payload from a first location to a second location. The transport vehicle, based on the set of instructions, lifts the payload at the first location for transporting to the second location. When a weight of the payload is below or equal to a threshold weight, the weight of the payload is distributed across the second set of wheels by way of the suspension arrangement. When the weight of the payload exceeds the threshold weight, the weight of the payload is distributed across the first and second sets of wheels by way of the guide arrangement and the suspension arrangement.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present disclosure are illustrated by way of example, and not limited by the appended figures, in which like references indicate similar elements.

Figure 1:
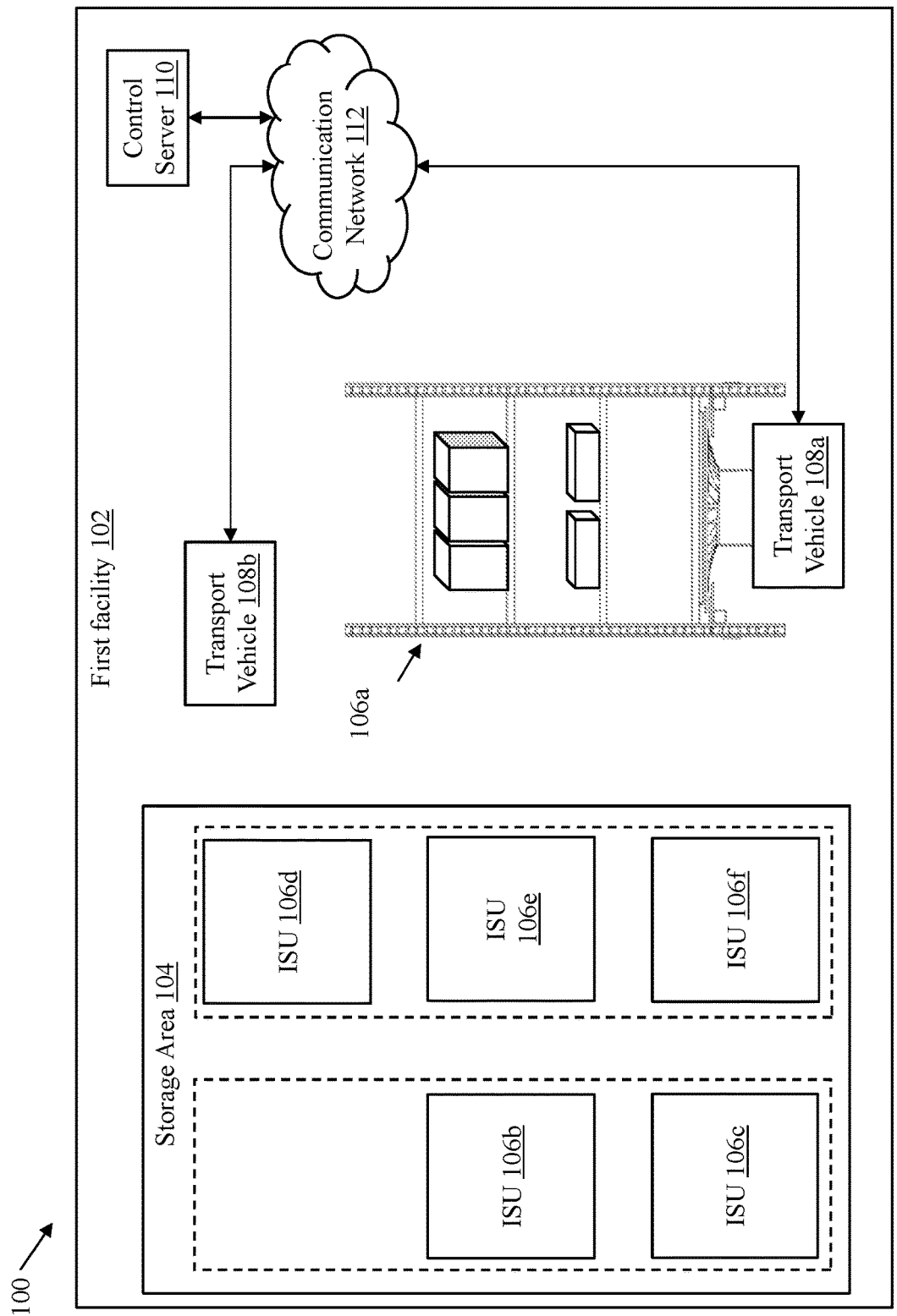
FIG. 1 is a block diagram that illustrates an exemplary environment, in accordance with an exemplary embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Various embodiments of the present disclosure provide a transport vehicle for transporting payloads. In one embodiment, the transport vehicle may include a primary chassis and a first set of wheels attached to a bottom surface of the primary chassis. The primary chassis may be supported by the first set of wheels. The transport vehicle may further include a guide arrangement mounted on the primary chassis. The guide arrangement may include a set of linear guides attached to a top surface of the primary chassis and a set of positive stops attached to the set of linear guides. The set of positive stops may be attached such that a constant distance is maintained between each positive stop and a top surface of the primary chassis. The transport vehicle may further include a secondary chassis that is slidably mounted on the guide arrangement (i.e., slidably mounted on the set of linear guides). The secondary chassis may be coupled to a second set of wheels, of the transport vehicle, by way of a suspension arrangement. The first and second sets of wheels may be castor wheels and drive wheels, respectively. The transport vehicle may further include a payload lifting arrangement, positioned on a top surface of the secondary chassis, to lift a payload. The secondary chassis may slide vertically along the set of linear guides based on the weight of the payload. Consequently, one or more suspension springs that constitute the suspension arrangement may get compressed, based on the weight of the payload and the distance between each positive stop and the top surface of the primary chassis. When a weight of the payload is below or equal to a threshold weight, the weight of the payload is distributed across the second set of wheels by way of the suspension arrangement. When the weight of the payload exceeds the threshold weight, the weight of the payload is distributed across the first and second sets of wheels by way of the guide arrangement and the suspension arrangement, respectively.

In some embodiments, "transport vehicle" may be a robotic vehicle (such as an automated guided vehicle, AGV) that executes one or more operations in a facility. For example, the transport vehicle transports a payload (e.g., an inventory item or a package) from one location to another location within a storage facility for order fulfillment or replenishment.

In some embodiments, "chassis" may be a mechanical frame of a transport vehicle that may house various mechanical and electronic components of the transport vehicle. For example, a primary chassis of the transport vehicle may house a controller, a motor, or a gear assembly of the transport vehicle.

In some embodiments, "guide arrangement" may be a combination of a set of linear guides and positive stops mounted on a primary chassis of a transport vehicle. A secondary chassis may be slidably mounted on the guide arrangement. The secondary chassis may slide along the set of linear guides based on a weight of a payload lifted by the transport vehicle.

In some embodiments, "suspension arrangement" may include a set of suspension springs or dampers that couples a secondary chassis of a transport vehicle to drive wheels (i.e., second set of wheels) of the transport vehicle.

In some embodiments, "payload lifting arrangement" may include one or more components that enable a transport vehicle to lift and/or transport various types of payloads. For example, the payload lifting arrangement of the transport vehicle may include a lifting device and a contact plate to lift and/or transport one or more packages.

In some embodiments, "threshold weight" may be a minimum weight of a payload lifted by a transport vehicle that may cause a secondary chassis of the transport vehicle to slide down the guide arrangement until the secondary chassis establishes contact with a set of positive stops included in the guide arrangement.

In some embodiments, "server" is a physical or cloud data processing system on which a server program runs. The server may be implemented in hardware or software, or a combination thereof. In one embodiment, the server may be implemented in computer programs executing on programmable computers, such as personal computers, laptops, or a network of computer systems. In one example, the server may be a warehouse management server.

FIG. 1 is a block diagram that illustrates an embodiment of an exemplary environment 100, in accordance with an exemplary embodiment of the present disclosure. The environment 100 shows a first facility 102 that includes a storage area 104. The storage area 104 includes first through sixth inventory storage units (ISUs) 106*a*-106*f* (hereinafter, the first through sixth ISUs 106*a*-106*f* are collectively referred to as "the ISUs 106"). The first facility 102 further includes first and second transport vehicles 108*a* and 108*b* (hereinafter, the first and second transport vehicles 108*a* and 108*b* are collectively referred to as "the transport vehicles 108"), and a control server 110. The control server 110 communicates with the transport vehicles 108 by way of a communication network 112 or via separate communication networks established therebetween.

The first facility 102 is a facility that utilizes one or more transport vehicles (e.g., the transport vehicles 108) for performing one or more operations (e.g., transporting a payload within the first facility 102 from a first location to a second location). Examples of the first facility 102 may include, but are not limited to, a warehouse, a storage facility, a retail store, a factory, an industrial laboratory, a sorting facility, a parcel processing facility, or the like. In a non-limiting example, the first facility 102 is a storage facility that stores one or more packages or inventory items for order fulfillment and/or selling. Examples of the inventory items may include, but are not limited to, groceries, apparel, electronic goods, mechanical goods, or the like. The storage area 104 is a section of the first facility 102, where the ISUs 106 are placed for storing the inventory items or the packages. The storage area 104 may be of any shape or size. In one embodiment, the ISUs 106 in the storage area 104 may be arranged to form aisles therebetween. Arrangement of the ISUs 106 in the storage area 104 is a standard practice and will be apparent to those of skill in the art. While FIG. 1 shows only two columns of ISUs, it will be apparent to those of skill in the art that the storage area 104 may include any number of ISUs arranged in any manner without deviating from the scope of the disclosure.

The ISUs 106 are storage units that store various inventory items and/or various packages. Each ISU may include multiple shelves, enabling the ISUs 106 to store various inventory items and/or packages. Each ISU 106 may further include a reference marker attached to or formed on a bottom surface of a corresponding base shelf for uniquely identifying the corresponding ISU 106. Examples of the reference marker may include, but are not limited to, a barcode, a quick response (QR) code, a radio frequency identification device (RFID) tag, or the like. It will be apparent to those of skill in the art that the ISUs 106 may further include additional structural features that aid in carrying or otherwise transporting the ISUs 106, without deviating from the scope of the disclosure. The ISUs 106 may be transported by the transport vehicles 108 within the first facility 102, for order fulfillment or replenishment.

The transport vehicles 108 may be robotic vehicles (i.e., automated guided vehicles, AGVs) used in the first facility 102 for lifting and transporting payloads (e.g., the ISUs 106) between various locations. While the current embodiment refers to the ISUs 106 as payloads, it will be apparent to those of skill in the art that the transport vehicles 108 may transport any other type of payload (e.g., inventory items or packages) without deviating from the scope of the disclosure. The transport vehicles 108 may be configured to communicate with the control server 110 via the communication network 112 by using various wired, wireless, or optical communication protocols. The transport vehicles 108 may vary in terms of sizes, dimensions, weight lifting capacity, or the like.

The first transport vehicle 108a may include a set of chassis, including at least a primary chassis and a secondary chassis. The first transport vehicle 108a may further include a guide arrangement mounted on the primary chassis. The guide arrangement may include a set of linear guides and positive stops. A linear guide may be a block and rail system that supports motion of one or more components (e.g., the secondary chassis) along the linear guide. A positive stop may be a mechanical component attached to the linear guide, such that the positive stop restricts a movement of the one or more components along the linear guide when the one or more components come in contact with the positive stop. The positive stop may be of any shape or size. The positive stop may, in one embodiment, be detached from the linear guide. The set of linear guides may be mounted on the primary chassis. The set of positive stops may be attached to the set of linear guides such that a constant distance is maintained between a top surface of the primary chassis and each of the set of positive stops. The secondary chassis may be slidably mounted on the guide arrangement (e.g., mounted on the set of linear guides) such that the primary and secondary chassis are parallel and spaced apart from each other. The set of positive stops may restrict a downward movement of the secondary chassis along the set of linear guides based on a contact established between the secondary chassis and the set of positive stops.

The primary and secondary chassis may be attached to first and second sets of wheels, respectively. The first and second sets of wheels may support the primary and secondary chassis, respectively, on a surface. In one embodiment, the first set of wheels includes castor wheels and the second set of wheels includes drive wheels. The secondary chassis may be attached to the second set of wheels by way of a suspension arrangement. In other words, the secondary chassis may be mechanically coupled to the second set of wheels by way of one or more suspension springs that form the suspension arrangement. The one or more suspension springs may help reduce shocks and/or vibrations that may occur as a result of an irregular floor surface of the first facility 102. Utility and selection of suspension springs is well known to those of skill in the art. The suspension springs may be of various types such as, but not limited to, rubber springs, metal coil springs, leaf springs, shock absorbers, dampers, or the like. The suspension arrangement may incorporate types of suspension arrangements such as, but not limited to, swing-arm suspension, multilink suspension, MacPherson struts, or the like. Each of the first set of wheels (e.g., the castor wheels) may be coupled to the primary chassis by way of a corresponding mechanical housing. Each mechanical housing may include a castor wheel and a mounting assembly that allows installation of the mechanical housing to the primary chassis. Each mechanical housing may be mounted to the primary chassis. In order to avoid pitching of the first transport vehicle 108a on the floor surface of the first facility 102, the primary chassis is not coupled to the first set of wheels by way of any suspension arrangement.

Figure 2:
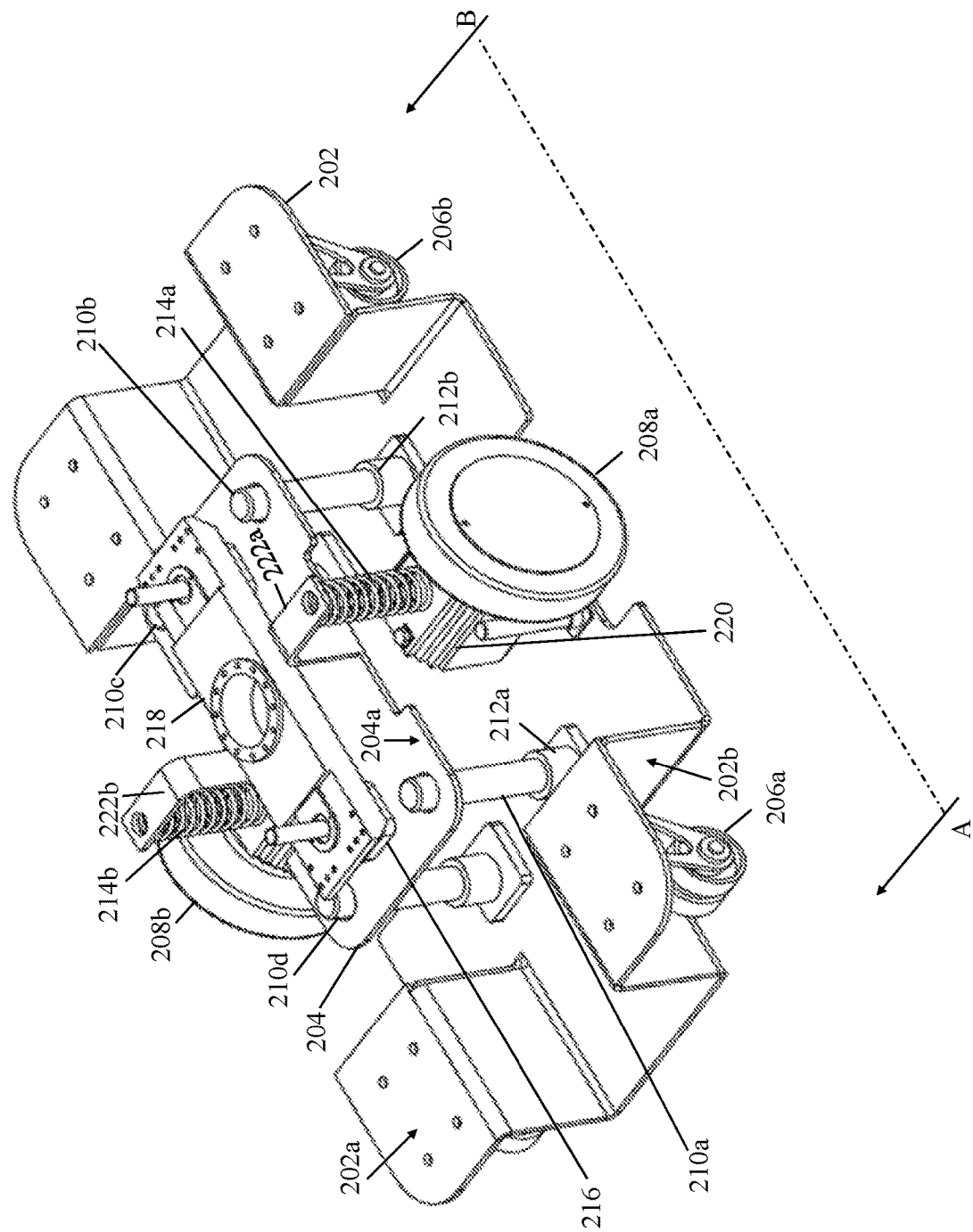
FIG. 2 is a schematic diagram that illustrates a three-dimensional (3D) view of a transport vehicle of FIG. 1, in accordance with an exemplary embodiment of the present disclosure.

The first transport vehicle 108a may further include a payload lifting arrangement for lifting a payload (e.g., inventory items or the first ISU 106a). The payload lifting arrangement may be positioned on top of the secondary chassis. When the payload is lifted by the payload lifting arrangement, the secondary chassis may slide (e.g., slide vertically) along the guide arrangement due to a weight of the payload. When the weight of the payload (e.g., the first ISU 106a) is less than or equal to a threshold weight, no contact is established between the secondary chassis and the set of positive stops, and the weight is distributed across the second set of wheels by way of the suspension arrangement. When the weight of the payload exceeds the threshold weight, the secondary chassis comes in contact with the set of positive stops, and the weight is distributed across the first and second sets of wheels. The second transport vehicle 108b may be structurally and functionally similar to the first transport vehicle 108a. Structure of the transport vehicles 108 is shown in FIG. 2.

The control server 110 may include suitable logic, circuitry, interfaces, and/or code, executable by the circuitry, to facilitate various operations in the first facility 102. Examples of the control server 110 may include, but are not limited to, personal computers, laptops, mini-computers, mainframe computers, any non-transient and tangible machine that can execute a machine-readable code, cloud-based servers, distributed server networks, or a network of computer systems. The control server 110 may be realized through various web-based technologies such as, but not limited to, a Java web-framework, a .NET framework, a personal home page (PHP) framework, or any other web-application framework. The control server 110 may be maintained by a storage facility management authority or a third-party entity that facilitates inventory management and handling operations for the first facility 102. It will be understood by a person having ordinary skill in the art that the control server 110 may execute other storage facility management operations as well along with the inventory management operations.

The control server 110 may receive one or more service requests, for performing one or more operations, from an external server. Based on the received one or more requests, the control server 110 may be configured to communicate instructions (e.g., transit instructions) to the transport vehicles 108 for transporting payloads (e.g., the ISUs 106) from the first location to the second location in the first facility 102. In a non-limiting example, a transit instruction may include reference marker details of an ISU (e.g., the first ISU 106*a*) that is to be transported and path details of a path that is to be traversed by each transport vehicle 108 for transporting a corresponding payload. A transport vehicle (e.g., the first transport vehicle 108*a*) may transport a payload from the first location to the second location based on information (e.g., reference marker details of a corresponding ISU and path details of a corresponding path) included in a corresponding transit instruction.

The communication network 112 is a medium through which instructions and messages are transmitted between the transport vehicles 108 and the control server 110. Examples of the communication network 112 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 112 in accordance with various wired and wireless communication protocols, such as Transmission Control Protocol and Internet Protocol (TCP/IP), User Datagram Protocol (UDP), Long Term Evolution (LTE) communication protocols, or any combination thereof.

FIG. 2 is a schematic diagram that illustrates a three-dimensional (3D) view of the first transport vehicle 108*a*, in accordance with an exemplary embodiment of the disclosure. The first transport vehicle 108*a* includes the primary chassis (hereinafter, designated as "the primary chassis 202"), the secondary chassis (hereinafter, designated as "the secondary chassis 204"), first and second wheels 206*a* and 206*b* (hereinafter, collectively referred to and designated as "the first set of wheels 206"), and third and fourth wheels 208*a* and 208*b* (hereinafter, collectively referred to and designated "the second set of wheels 208"). The first and second wheels 206*a* and 206*b* are castor wheels and the third and fourth wheels 208*a* and 208*b* are drive wheels. As understood by one of ordinary skill in the art, the first set of wheels 206 may include more than two castor wheels. In some embodiments, the first transport vehicle 108*a* includes four castor wheels and two drive wheels. It will be apparent to those of skill in the art that the first transport vehicle 108*a* may be modified to include any number of drive wheels and castor wheels, without detracting from the scope of the disclosure. As understood by one of ordinary skill in the art, the shape of the wheels is not limited to the shape illustrated in FIG. 2, and the shape of the wheels may be any desired shape that facilitates movement of the first transport vehicle 108*a*.

The first transport vehicle 108*a* further includes first through fourth linear guides 210*a*-210*d* (collectively referred to and designated as "the set of linear guides 210"), first through fourth positive stops (collectively referred to and designated as "the set of positive stops 212"), first and second suspension springs 214*a* and 214*b* (collectively referred to and designated as "the suspension arrangement 214"). While the set of positive stops 212 may include a positive stop attached to each linear guide, only the first and second positive stops 212*a* and 212*b* are labelled in FIG. 2. The first transport vehicle 108*a* further includes a lifting device 216 and a contact plate 218 that constitute the payload lifting arrangement of the first transport vehicle 108*a*. The first transport vehicle 108*a* further includes a drive mechanism 220 used to drive the second set of wheels 208.

As described in the foregoing in accordance with some embodiments, the primary chassis 202 is supported by the first set of wheels 206. The first set of wheels 206 is attached to a bottom surface 202*b* of the primary chassis 202. The guide arrangement (i.e., the set of linear guides 210 and the set of positive stops 212) is mounted on the primary chassis 202. As shown in FIG. 2, the secondary chassis 204 is slidably mounted on the guide arrangement. The secondary chassis 204 is connected to the second set of wheels 208 that supports the secondary chassis 204 by way of the suspension arrangement 214. As shown in FIG. 2, each of the first and second suspension springs 214*a* and 214*b* are connected to the secondary chassis 204 by way an 'L'-type bracket (e.g., first and second 'L'-type brackets 222*a* and 222*b*). Thus, the third wheel 208*a* is connected to the secondary chassis 204 by way of the first 'L'-type bracket 222*a* and the first suspension spring 214*a*. Similarly, the fourth wheel 208*b* is connected to the secondary chassis 204 by way of the second 'L'-type bracket 222*b* and the second suspension spring 214*b*. The payload lifting arrangement comprising the lifting device 216 and the contact plate 218 is positioned on a top surface 204*a* of the secondary chassis 204. The lifting device 216 may alter a position of the contact plate 218 to lift a payload (e.g., the first ISU 106*a*). In FIG. 2, the contact plate 218 is shown to be in a lowered position.

Figure 3:
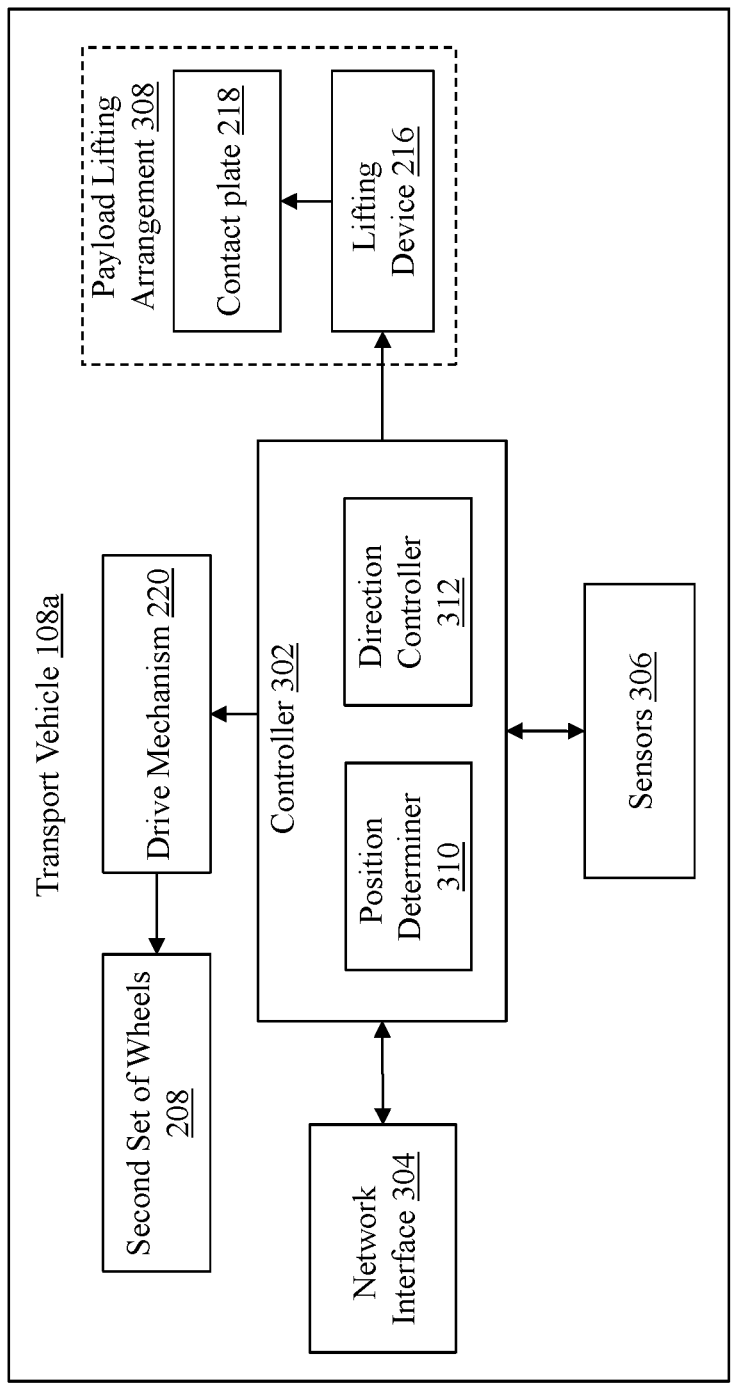
FIG. 3 is a block diagram that illustrates various components of the transport vehicle, in accordance with an exemplary embodiment of the present disclosure.

It will be apparent to those of skill in the art that FIG. 2 is a simplified illustration of the first transport vehicle 108*a*. The first transport vehicle 108*a* is not limited to include only the components shown in FIG. 2. FIG. 2 does not, in any manner, constrain the scope of the disclosure. The first transport vehicle 108*a* may further include other components (e.g., a controller, a motor, a set of sensors as shown in FIG. 3) required for appropriate functioning. The first transport vehicle 108*a* may further include a housing that accommodates the components shown in FIG. 2.

FIG. 3 is a block diagram that illustrates various components of the first transport vehicle 108*a*, in accordance with an exemplary embodiment of the disclosure. The first transport vehicle 108*a* includes a controller 302, a network interface 304, sensors 306, and the payload lifting arrangement (hereinafter, designated as "the payload lifting arrangement 308"). The first transport vehicle 108*a* further includes the second set of wheels 208, the lifting device 216, the contact plate 218, and the drive mechanism 220. The first transport vehicle 108a further includes the primary and the secondary chassis 202 and 204, the first set of wheels 206, the set of linear guides 210, the set of positive stops 212, and the suspension arrangement 214. For the sake of brevity, the first set of wheels 206, the set of linear guides 210, the set of positive stops 212, and the suspension arrangement 214 have been omitted from FIG. 3.

The controller 302 may include suitable logic, circuitry, interfaces, and/or code, executable by the circuitry, for navigating the first transport vehicle 108a in the first facility 102. The controller 302 may be receptive to transit instructions received from the control server 110. The controller 302 may be further configured to control the movement of the contact plate 218 by way of the lifting device 216. The controller 302 may include a position determiner 310 and a direction controller 312.

The network interface 304 may include suitable logic, circuitry, interfaces, and/or code, executable by the circuitry, for facilitating communication using one or more communication protocols. For example, the network interface 304 may facilitate communication between the first transport vehicle 108a and the control server 110. Examples of the network interface 304 may include, but are not limited to, an antenna, a radio frequency transceiver, a wireless transceiver, a Bluetooth transceiver, an ethernet based transceiver, a universal serial bus (USB) transceiver, or any other device configured to transmit and receive data.

The lifting device 216 may be configured to controllably move the contact plate 218 under the control of the controller 302. The lifting device 216 may comprise a linear actuator and a rotary actuator. The linear actuator may be configured to controllably raise or lower the contact plate 218 relative to a body of the first transport vehicle 108a. For example, the linear actuator may vertically move the contact plate 218 from a home position (e.g., a resting position, a default position, or a lowered position) to multiple raised positions. The linear actuator may further lower the contact plate 218 from multiple raised positions to the home position. The rotary actuator may rotate a lifted contact plate 218 in clockwise or anti-clockwise direction. For example, the rotary actuator may rotate a lifted contact plate 218 by a predetermined angle in the clockwise direction and may further reverse the rotation to return the contact plate 218 to its original position. The lifting device 216 and the contact plate 218 collectively constitute the payload lifting arrangement 308.

The drive mechanism 220 may include, among other components, one or more motors and one or more motor drivers for driving the second set of wheels 208. For example, the drive mechanism 220 may provide current to the one or more motors to drive the second set of wheels 208. In one embodiment, the drive mechanism 220 may vary the current provided to the one or more motors to vary the speed of the rotation of the second set of wheels 208. The drive mechanism 220 may further include one or more components (e.g., brakes or gear assemblies) required for movement of the first transport vehicle 108a.

The sensors 306 may include, but are not limited to, one or more photo sensors, one or more proximity sensors, or one or more weight sensors. For example, the photo sensors may be configured to scan the reference markers on the ISUs 106 and provide an input to the controller 302 for identifying a required ISU from the ISUs 106. The weight sensors may be configured to determine the weight exerted by a payload, lifted by the first transport vehicle 108a, on each of the first and second sets of wheels 206 and 208. The weight sensors may be further configured to provide an input, indicating the weight exerted by the lifted payload on each of the first and second sets of wheels 206 and 208, to the controller 302. For example, the controller 302 may be configured to determine a position of a centre of gravity of a payload (e.g., the first ISU 106a) based on the weight exerted by the payload on each of the first through fourth wheels 206a, 206b, 208a, and 208b. It will be apparent to those of skill in the art that other sensors, may be used for determining various parameters mentioned above, without deviating from the scope of the disclosure.

The position determiner 310 and the direction controller 312 may enable the first transport vehicle 108a to navigate through the first facility 102. For example, the position determiner 310 may be configured to determine a real-time position of the first transport vehicle 108a in the first facility 102. The direction controller 312 may be configured to control the direction of movement of the first transport vehicle 108a in the first facility 102 with respect to the current location.

Figure 4:
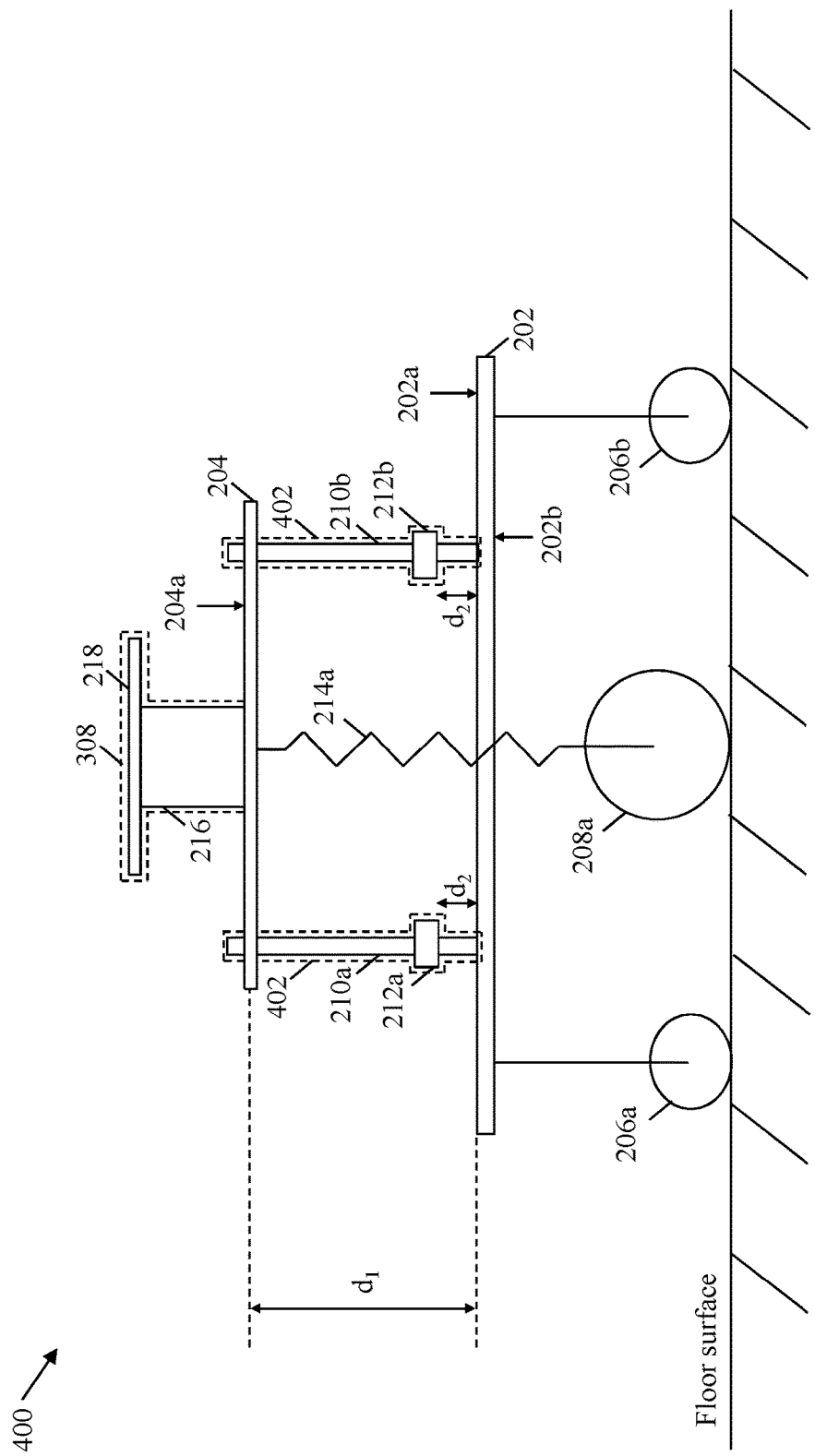
FIG. 4 is a block diagram that illustrates the transport vehicle in a no-load condition, in accordance with an exemplary embodiment of the present disclosure.

FIG. 4 is a diagram 400 that illustrates the first transport vehicle 108a in a no-load condition, in accordance with an exemplary embodiment of the present disclosure. FIG. 4 illustrates a side view of the first transport vehicle 108a along the A-B axis shown in FIG. 2. FIG. 4 shows the primary chassis 202, the secondary chassis 204, the first and second wheels 206a and 206b, and the third wheel 208a. FIG. 3 further shows the guiding arrangement (hereinafter, designated as "the guiding arrangement 402") that includes the first and second linear guides 210a and 210b and the first and second positive stops 212a and 212b. FIG. 3 further shows the first suspension spring 214a and the payload lifting arrangement 308 that includes the lifting device 216 and the contact plate 218.

With reference to FIG. 4, the first transport vehicle 108a is in the no-load condition (i.e., the first transport vehicle 108a is not carrying any payload). When there is no payload placed on the contact plate 218, the secondary chassis 204 remains in a default position with respect to the primary chassis 202. In a non-limiting example, the default position of the secondary chassis 204 is at a distance '$d_1$' from the top surface 202a of the primary chassis 202 (i.e., the primary and secondary chassis 202 and 204 are separated by a distance '$d_1$'). The separation between the primary and secondary chassis 202 and 204 may depend on various factors such as, but not limited to, a weight of the secondary chassis 204, a weight of the lifting device 216, a weight of the contact plate 218, a spring constant of each of the first and second suspension springs 214a and 214b, or a length of each of the first and second suspension springs 214a and 214b. Each of the set of positive stops 212 may be attached to a corresponding linear guide at a distance '$d_2$' from the top surface 202a of the primary chassis 202. As shown in FIG. 4, the first positive stop 212a is attached to the first linear guide 210a at a distance '$d_2$' from the top surface 202a of the primary chassis 202. The first and second suspension springs 214a and 214b may or may not be pre-loaded. In a non-limiting example, neither the first suspension spring 214a nor the second suspension spring 214b is pre-loaded. Therefore, the first suspension spring 214a is shown to be in a non-compressed condition. In the no-load condition, the first set of wheels 206 may support, among others, a weight of the primary chassis 202, a weight of the set of linear guides 210, and a weight of the set of positive stops 212.

The first set of wheels 206 may further support a weight of other components (e.g., the drive mechanism 220, the controller 302, the sensors 306, or the like) that may be housed in the primary chassis 202. The second set of wheels 208 may support, among others the weight of the first and second suspension springs 214a and 214b, the weight of the secondary chassis 204, the weight of the lifting device 216, and the weight of the contact plate 218. Therefore, the first and second sets of wheels 206 and 208 support a kerb weight (i.e., a weight of the first transport vehicle 108a while carrying no payload) of the first transport vehicle 108a, in a manner as described above. As will be known to those of skill in the art, friction acting upon the first transport vehicle 108a may be a function of a coefficient (static or kinetic) of friction of the floor surface of the first facility 102 and a normal force acting upon the first transport vehicle 108a. In some embodiments, the normal force may be equal to the kerb weight of the first transport vehicle 108a. Therefore, in the no-load condition, the first transport vehicle 108a may leverage the kerb weight of the first transport vehicle 108a to generate traction and move on the floor surface of the first facility 102.

Figure 5:
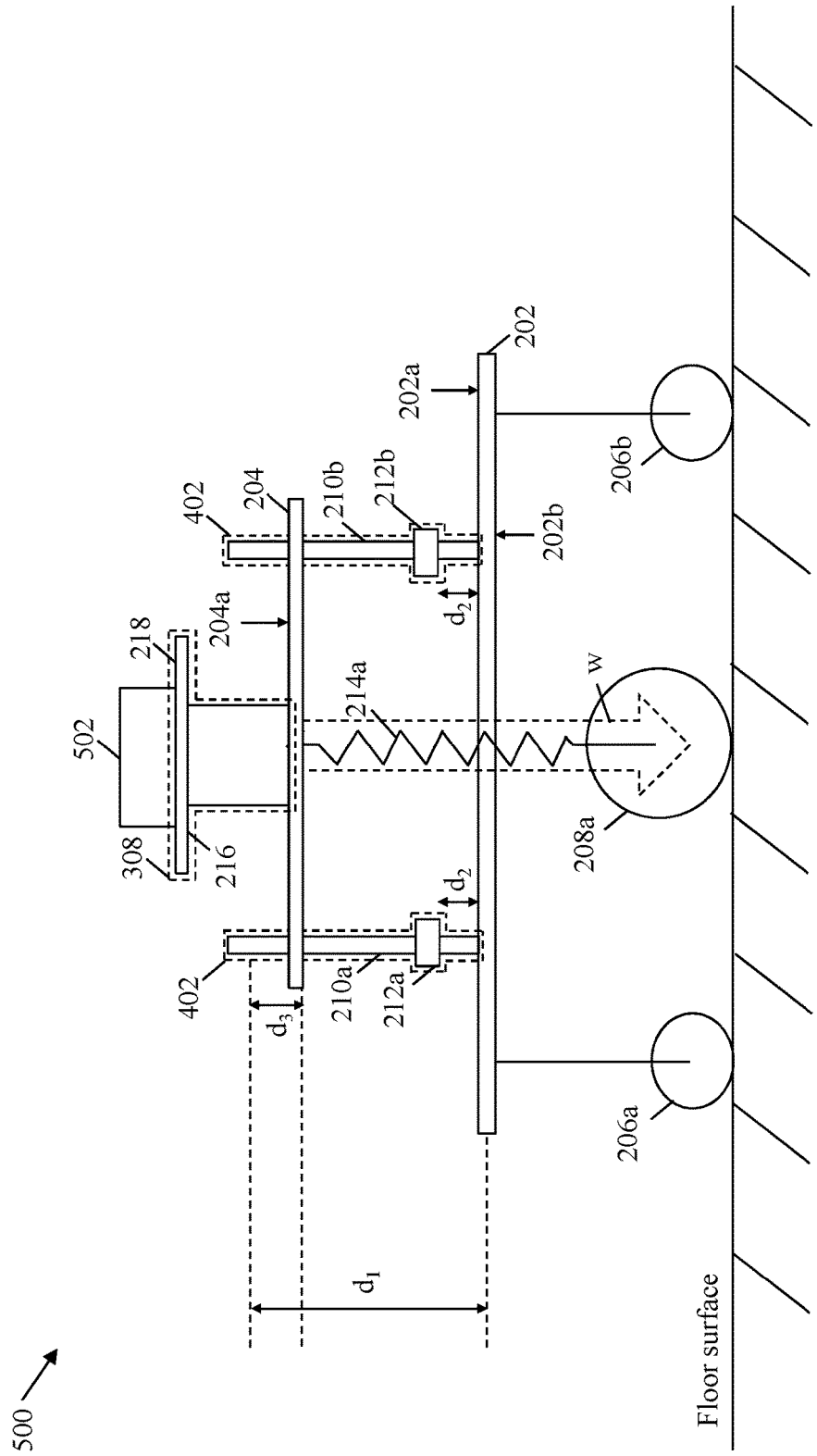
FIG. 5 is a diagram that illustrates the transport vehicle transporting a payload, in accordance with an exemplary embodiment of the present disclosure.

FIG. 5 is a diagram 500 that illustrates the first transport vehicle 108a transporting a payload, in accordance with an exemplary embodiment of the present disclosure. FIG. 5 describes a scenario where a weight of a payload 502 transported by the first transport vehicle 108a is less than the threshold weight.

When the payload 502 is lifted by the contact plate 218, the weight (w) of the payload 502 acts upon the contact plate 218 and, consequently, the secondary chassis 204. The weight (w) of the payload 502 causes the secondary chassis 204 to slide down by a distance '$d_3$', along the first set of linear guides 210, compressing the first and second suspension springs 214a and 214b. Consequently, the second set of wheels 208 bears the weight (w) of the payload 502, the weight of the secondary chassis 204, the weight of the lifting device 216, and the weight of the contact plate 218. The distance '$d_3$' by which the secondary chassis 204 slides along the set of linear guides 210 may be directly proportional to the weight (w) of the payload 502.

In scenarios where the weight (w) of the payload 502 exceeds the threshold weight, the secondary chassis 204 may slide downwards until the secondary chassis 204 comes in contact with the set of positive stops 212. Contact between the secondary chassis 204 and the set of positive stops 212 may be established when the secondary chassis 204 slides downward, along the set of linear guides 210, for a distance equal to '$d_1$-$d_2$'. A minimum weight of the payload that may cause the secondary chassis 204 to slide for a distance '$d_1$-$d_2$' along the set of linear guides 210 is referred to as 'threshold weight'. When the weight (w) of the payload 502 exceeds the threshold weight, the secondary chassis 204 may slide down along the set of linear guides 210 until the secondary chassis 204 comes in contact with the set of positive stops 212.

However, in the current scenario illustrated in FIG. 5, the weight (w) of the payload 502 is less than the threshold weight. Therefore, when the payload 502 is lifted by the contact plate 218, the weight (w) of the payload 502 acts upon the secondary chassis 204, causing the secondary chassis 204 to slide downwards along the set of linear guides 210. The distance '$d_3$' by which the secondary chassis 204 is displaced from the default position may be directly proportional to the weight (w) of the payload 502, the spring constant, and the length of each of the first and second suspension springs 214a and 214b. In the current scenario where the weight (w) of the payload 502 is less than the threshold weight, an entirety of the weight (w) of the payload 502 is borne by the second set of wheels 208 by way of the first and second suspension springs 214a and 214b. Consequently, the friction acting upon the first transport vehicle 108a increases proportional to the weight (w) of the payload 502. Therefore, the first transport vehicle 108a leverages the weight (w) of the payload 502 to generate traction.

Figure 6:
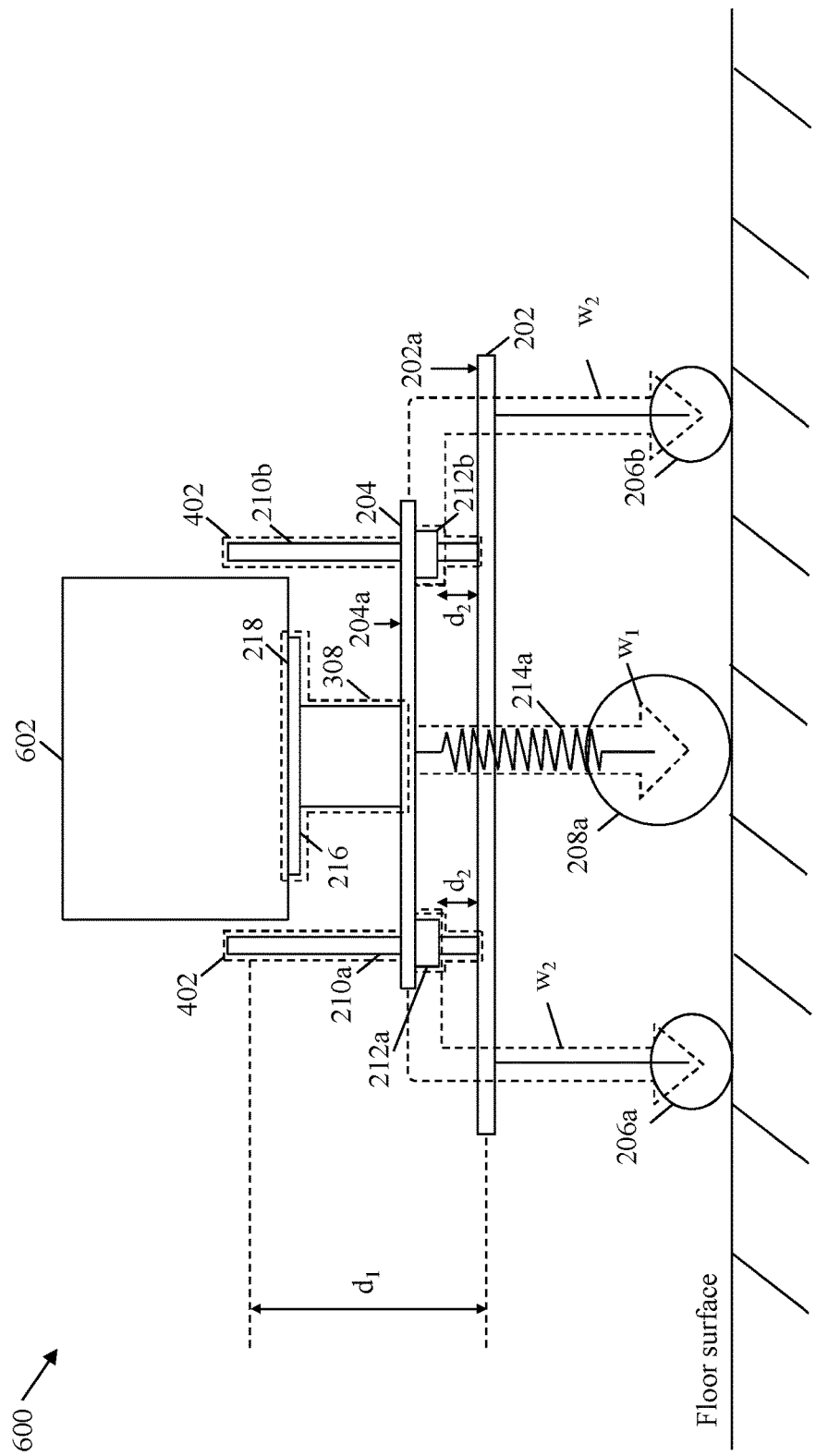
FIG. 6 is a diagram that illustrates the transport vehicle transporting another payload, in accordance with an exemplary embodiment of the present disclosure.

FIG. 6 is a diagram 600 that illustrates the first transport vehicle 108a transporting another payload, in accordance with an exemplary embodiment of the present disclosure. FIG. 6 describes a scenario where a weight of a payload 602 transported by the first transport vehicle 108a is greater than the threshold weight.

When the payload 602, is lifted on the contact plate 218, the weight (w) of the payload 602 acts upon the secondary chassis 204. The weight (w) of the payload 602 causes the secondary chassis 204 to slide downwards, along the first set of linear guides 210, compressing the first and second suspension springs 214a and 214b. In the current scenario, the weight (w) of the payload 602 exceeds the threshold weight. Therefore, the secondary chassis 204 slides downwards until the secondary chassis 204 establishes contact with the set of positive stops 212. In other words, the secondary chassis 204 slides downwards, along the set of linear guides 210, for a distance equal to '$d_1$-$d_2$'. When contact is established between the secondary chassis 204 and the set of positive stops 212, the set of positive stops 212 restricts further downward movement of the secondary chassis 204 along the set of linear guides 210. Consequently, further compression of the first and second suspension springs 214a and 214b is restricted. Thus, the first and second sets of wheels 206 and 208 bear the weight (w) of the payload 602. The second set of wheels 208 may bear (i.e., support) a weight ($w_1$) equal to the threshold weight, while the first set of wheels 206 may bear a weight ($w_2$) equal to a difference between the threshold weight ($w_1$) and the weight (w) of the payload 602. In other words, the weight (w) of the payload is distributed across the first and second sets of wheels 206 and 208 by way of the guide arrangement 402 and the suspension arrangement 214.

In one embodiment, the positions (i.e., attachment positions) of the set of positive stops 212 may be varied to adjust the threshold weight and, consequently, an extent to which the first and second suspension springs 214a and 214b may be compressed. In one embodiment, the positions of the set of positive stops 212 may be controlled by way of an actuator (e.g., an electric actuator, a pneumatic actuator, an electro-pneumatic actuator, or the like). For example, the actuator may be configured to automatically adjust the positions of the set of positive stops 212. In another example, the actuator may configured to adjust the positions of the set of positive stops 212 based on one or more commands received from the control server 110 (i.e., the actuator may be controlled by the control server 110 to adjust the positions of the set of positive stops 212). The extent to which the first and second suspension springs 214a and 214b may be compressed may be based on the weight of a payload (e.g., the payload 602) and the distance '$d_1$' between the position of each positive stop and the top surface 202a of the primary chassis 202. For example, the extent to which the first and second suspension springs 214a and 214b may be compressed is increased when the distance '$d_1$' is decreased.

Figure 7:
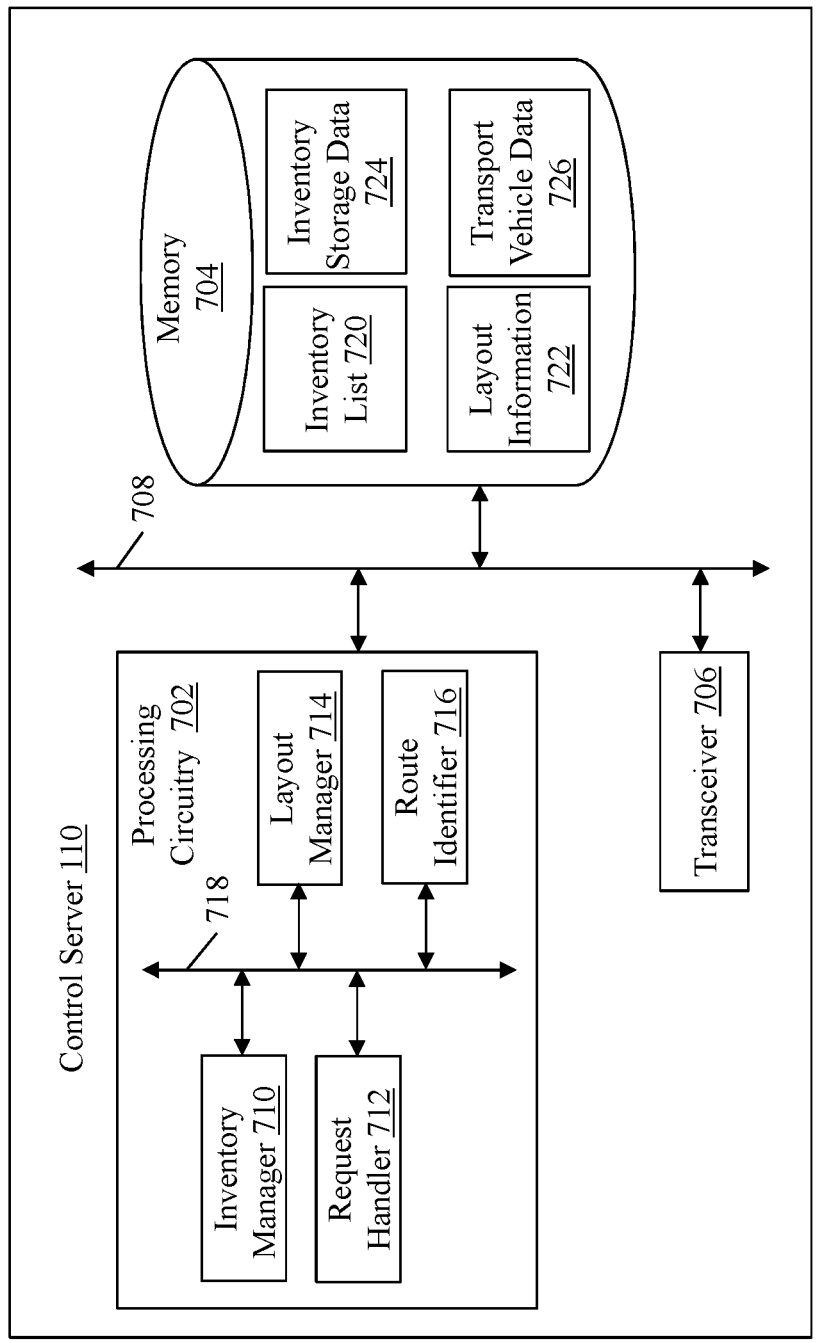
FIG. 7 is a diagram that illustrates a control server of FIG. 1, in accordance with an exemplary embodiment of the present disclosure.

FIG. 7 is a block diagram that illustrates the control server 110, in accordance with an exemplary embodiment of the present disclosure. The control server 110 includes processing circuitry 702, a memory 704, and a transceiver 706 that communicate with each other by way of a first communication bus 708. The processing circuitry 702 may include an inventory manager 710, a request handler 712, a layout manager 714, and a route identifier 716 that communicate with each other by way of a second communication bus 718. It will be apparent to a person of ordinary skill in the art that the control server 110 is for illustrative purposes and not limited to any specific combination or hardware circuitry and/or software. For example, the control server 110 may be implemented by a server system that includes a plurality of servers each configured to perform one or a combination of the functions of the server. Furthermore, the control server 110 may be implemented by a plurality of devices that are operating over a cloud and communicating with devices in the first facility 102 via the communication network 112.

The processing circuitry 702 may include suitable logic, circuitry, interfaces, and/or code, executed by the circuitry, for executing various operations, such as the inventory management operations, warehouse management operations, procurement operations, maintenance operations, or the like. The processing circuitry 702 may be configured to determine positions of the ISUs 106 and the transport vehicles 108, issue transit instruction to the transport vehicles 108 for performing one or more operations (e.g., transporting the payload 502 from the first location to the second location), control navigation of the transport vehicles 108, or the like. The processing circuitry 702 may execute the operations by way of the inventory manager 710, the request handler 712, the layout manager 714, and the route identifier 716. Examples of the processing circuitry 702 may include, but are not limited to, an application-specific integrated circuit (ASIC) processor, a reduced instruction set computing (RISC) processor, a complex instruction set computing (CISC) processor, a field-programmable gate array (FPGA), and the like.

The memory 704 may include suitable logic, circuitry, interfaces, and/or code, executed by the circuitry, to store an inventory list 720, layout information 722, inventory storage data 724, and transport vehicle data 726. Examples of the memory 704 may include, but are not limited to, a random-access memory (RAM), a read-only memory (ROM), a removable storage drive, a hard disk drive (HDD), a flash memory, a solid-state memory, and the like. In one embodiment, the memory 704 may be realized through various database technologies such as, but not limited to, Microsoft® SQL, Oracle®, IBM DB2®, Microsoft Access®, PostgreSQL®, MySQL®, and SQLite®. It will be apparent to a person skilled in the art that the scope of the disclosure is not limited to realizing the memory 704 in the control server 110, as described herein. In other embodiments, the memory 704 may be realized in form of an external database server or a cloud storage working in conjunction with the control server 110, without departing from the scope of the disclosure.

The inventory list 720 may include the list of inventory items and packages stored in the first facility 102 and a number of units of each inventory item stored in the first facility 102. The layout information 722 may include information of a layout of the first facility 102, such as location data of the ISUs 106. The layout information 722 may further include real-time path availability information of various paths in the first facility 102. For example, a first path in the first facility 102 may be under maintenance and, therefore, unavailable for traversing by the first transport vehicle 108*a*.

The inventory storage data 724 may be indicative of storage locations of the inventory items stored in the ISUs 106. The inventory storage data 724 may further be indicative of the reference markers of the ISUs 106. The reference identifiers may be unique codes assigned to each of the ISUs 106. In one example, the reference markers are RFID tags that are readable by the transport vehicles 108. Thus, based on the inventory storage data 724, the control server 110 may be aware of the locations of each inventory item stored in the first facility 102. The inventory storage data 724 may further include details of the current positions of the ISUs 106.

The transport vehicle data 726 may be indicative of details of the transport vehicles 108 available in the first facility 102. The details of the transport vehicles 108 may include a weight lifting capacity, a size, and dimensions of each of the transport vehicles 108.

The transceiver 706 may transmit and receive data over the communication network 112 using one or more communication network protocols. The transceiver 706 may transmit various requests and messages to the transport vehicles 108 and receives requests and messages from the transport vehicles 108. Examples of the transceiver 706 may include, but are not limited to, an antenna, a radio frequency transceiver, a wireless transceiver, a Bluetooth transceiver, an ethernet based transceiver, a USB transceiver, or any other device configured to transmit and receive data.

The inventory manager 710 may manage the inventory list 720 stored in the memory 704. For example, the inventory manager 710 may add new inventory items to the inventory list 720 when the new inventory items are stored in the first facility 102 and may update the inventory list 720 in real-time.

The request handler 712 may process service requests received from the external server and may store, in the memory 704, a record of each historical service request. In one embodiment, the request handler 712 may merge one or more service requests to optimize operations in the first facility 102. The layout manager 714 may manage the layout information 722. For example, if there is any change in the layout of the first facility 102 (such as a change in the arrangement of the ISUs 106), the layout manager 714 updates the layout information 722 based on the change in the layout. The route identifier 716 may be responsible for identifying the optimal paths, e.g., an optimal path between the first and second locations.

Although the processing circuitry 702 is depicted as a hardware component in FIG. 7, a person skilled in the art will appreciate that the scope of the disclosure is not limited to realizing the processing circuitry 702 as the hardware component. In another embodiment, the functionality of the processing circuitry 702 may be implemented by way of a computer executable code or a set of computer readable instructions stored in the memory 704, without deviating from the spirit of the disclosure.

Techniques consistent with the present disclosure provide, among other features, a transport vehicle for transporting a payload. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the width or scope.

Embodiments of the disclosure feature transport vehicles (e.g., the transport vehicles 108) for transporting payloads in a facility. The first transport vehicle 108*a* features a multi-chassis setup that includes the primary and secondary chassis 202 and 204. As described in the foregoing, the first transport vehicle 108*a* leverages a weight of a payload (e.g., the payloads 502 and 602) to generate traction. Since the traction generated is proportional to the weight of the payload, the first transport vehicle 108a may transport the payload at high speeds without a risk of toppling the payload. Both the first and second sets of wheels 206 and 208 are always in contact with the floor surface, irrespective of the weight of the payload. Since the first set of wheels 206 is not attached to the primary chassis 202 by way of a suspension arrangement, pitching of the first transport vehicle 108a is mitigated. The attachment positions of the set of positive stops 212 may be varied to adjust the threshold weight, and, consequently, the extent to which the first and second suspension springs 214a and 214b may be compressed. Any weight of the payload that is over and above the threshold weight is borne by the first set of wheels 206 (i.e., the castor wheels). As a result, suspension springs of low length with low spring constants may be selected for coupling the secondary chassis 204 and the second set of wheels 208. A reduction in dimensions of suspension springs used in transport vehicles may correspond to reduction in a size of the transport vehicles, resulting in space savings for any entity that manages the first facility 102. Further, the attachment positions of the set of positive stops 212 may be adjusted in a manner such that the first and second suspension springs 214a and 214b are never fully compressed (even when a weight of the payload is high). Consequently, the first transport vehicle 108a may be able to accommodate undulations of high amplitude on the floor surface.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A transport vehicle, comprising:
   a primary chassis;
   a first set of wheels attached to a bottom surface of the primary chassis, wherein the first set of wheels supports the primary chassis;
   a guide arrangement mounted on the primary chassis;
   a secondary chassis slidably mounted on the guide arrangement, wherein the primary chassis and the secondary chassis are parallel and spaced apart from each other, wherein the guide arrangement includes a set of linear guides attached to a top surface of the primary chassis, wherein the secondary chassis is a single unit that is slidably mounted simultaneously on the set of linear guides;
   a second set of wheels coupled to the secondary chassis, wherein the second set of wheels supports the secondary chassis;
   a suspension arrangement that couples the second set of wheels to the secondary chassis, a first end of the suspension arrangement being coupled to the second set of wheels and a second end of the suspension arrangement being coupled to the secondary chassis separately from a location where the secondary chassis is slidably mounted on the guide arrangement; and
   a payload lifting arrangement positioned on a top surface of the secondary chassis to lift a payload, wherein when a weight of the payload is below or equal to a threshold weight, the weight of the payload is distributed across the second set of wheels by way of the suspension arrangement, and when the weight of the payload exceeds the threshold weight, the weight of the payload is distributed across the first and second sets of wheels by way of the guide arrangement and the suspension arrangement, respectively.

2. The transport vehicle of claim 1, wherein the guide arrangement comprises:
   a set of positive stops attached to the set of linear guides such that a first distance is maintained between the top surface of the primary chassis and each of the set of positive stops.

3. The transport vehicle of claim 2, wherein the secondary chassis slides vertically along the set of linear guides based on the weight of the payload.

4. The transport vehicle of claim 3, wherein the set of positive stops restricts a downward movement of the secondary chassis along the set of linear guides based on a contact established between the secondary chassis and the set of positive stops.

5. The transport vehicle of claim 2, wherein each of the set of positive stops is detachable from the corresponding set of linear guides, and wherein an attachment position of each of the set of positive stops on the corresponding set of linear guides is varied to adjust the threshold weight.

6. The transport vehicle of claim 2, wherein the suspension arrangement comprises one or more suspension springs such that compression of the one or more suspension springs is based on the weight of the payload and the first distance.

7. The transport vehicle of claim 1, wherein each of the first set of wheels is a castor wheel.

8. The transport vehicle of claim 1, wherein each of the second set of wheels is a drive wheel.

9. The transport vehicle of claim 1, further comprising a drive mechanism that controls a movement of the second set of wheels.

10. The transport vehicle of claim 1, wherein the weight of the payload generates traction on a surface that is in contact with the first and second sets of wheels.

11. The transport vehicle of claim 1, wherein the payload lifting arrangement comprises:
    a contact plate for lifting the payload; and
    a lifting device connected to the contact plate, wherein the lifting device moves the contact plate between a raised position and a lowered position.

12. A system for transporting a payload, comprising:
    a transport vehicle, comprising:
      a primary chassis;
      a first set of wheels attached to a bottom surface of the primary chassis, wherein the first set of wheels supports the primary chassis;
      a guide arrangement mounted on the primary chassis;
      a secondary chassis slidably mounted on the guide arrangement, wherein the primary chassis and the secondary chassis are parallel and spaced apart from each other, wherein the guide arrangement includes a set of linear guides attached to a top surface of the primary chassis, wherein the secondary chassis is a single unit that is slidably mounted simultaneously on the set of linear guides;
      a second set of wheels coupled to the secondary chassis, wherein the second set of wheels supports the secondary chassis;
      a suspension arrangement that couples the second set of wheels to the secondary chassis, a first end of the suspension arrangement being coupled to the second set of wheels and a second end of the suspension arrangement being coupled to the secondary chassis separately from a location where the secondary chassis is slidably mounted on the guide arrangement; and a payload lifting arrangement positioned on a top surface of the secondary chassis to lift the payload; and a server that is configured to communicate, to the transport vehicle, a set of instructions to transport the payload from a first location to a second location, wherein:

the transport vehicle, based on the set of instructions, lifts the payload at the first location for transporting to the second location, and when a weight of the payload is below or equal to a threshold weight, the weight of the payload is distributed across the second set of wheels by way of the suspension arrangement, and when the weight of the payload exceeds the threshold weight, the weight of the payload is distributed across the first and second sets of wheels by way of the guide arrangement and the suspension arrangement, respectively.

13. The system of claim 12, wherein the guide arrangement comprises:

a set of positive stops attached to the set of linear guides such that a first distance is maintained between the top surface of the primary chassis and each of the set of positive stops.

14. The system of claim 13, wherein the secondary chassis slides vertically along the set of linear guides based on the weight of the payload.

15. The system of claim 14, wherein the set of positive stops restricts a downward movement of the secondary chassis along the set of linear guides based on a contact established between the secondary chassis and the set of positive stops.

16. The system of claim 13, wherein each of the set of positive stops is detachable from the corresponding set of linear guides, and wherein an attachment position of each of the set of positive stops on the corresponding set of linear guides is varied to adjust the threshold weight.

17. The system of claim 13, wherein the suspension arrangement comprises one or more suspension springs such that compression of the one or more suspension springs is based on the weight of the payload and the first distance.

18. The system of claim 12, wherein each of the first set of wheels is a castor wheel and each of the second set of wheels is a drive wheel.

19. The system of claim 12, further comprising a drive mechanism that controls a movement of the second set of wheels.

20. The system of claim 12, wherein the payload lifting arrangement comprises:

a contact plate for lifting the payload; and a lifting device connected to the contact plate, wherein the lifting device moves the contact plate between a raised position and a lowered position.

* * * * *